(No Model.)

W. S. BLAISDELL.
PLANTING IMPLEMENT.

No. 588,386. Patented Aug. 17, 1897.

WITNESSES
John A. Rennie.
Alex. J. Wedderburn Jr.

INVENTOR,
William S. Blaisdell,
by John Wedderburn
Attorney

UNITED STATES PATENT OFFICE.

WILLIAM S. BLAISDELL, OF VICTORIA, FLORIDA.

PLANTING IMPLEMENT.

SPECIFICATION forming part of Letters Patent No. 588,386, dated August 17, 1897.

Application filed December 8, 1896. Serial No. 614,903. (No model.)

*To all whom it may concern:*

Be it known that I, WILLIAM S. BLAISDELL, a citizen of the United States, residing at Victoria, in the county of Lake and State of Florida, have invented certain new and useful Improvements in Planting Implements; and I do hereby declare the following to be a full, clear, and exact description of the invention, such as will enable others skilled in the art to which it appertains to make and use the same.

This invention has reference to a novel construction in a planting implement, the object being to provide a device of this character that readily opens the ground, deposits the seed, and then closes the opening in an easy and quick manner.

The invention consists in the features of construction hereinafter fully described and specifically claimed.

Figure 1:
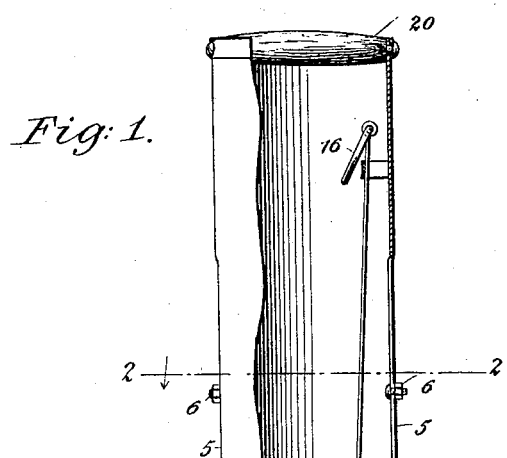
Figure 2:
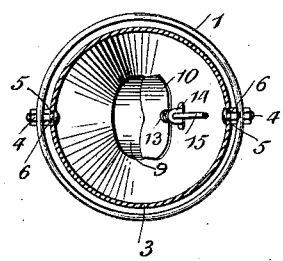
Figure 3:
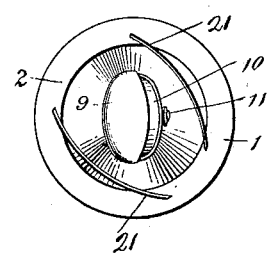
Figure 4:
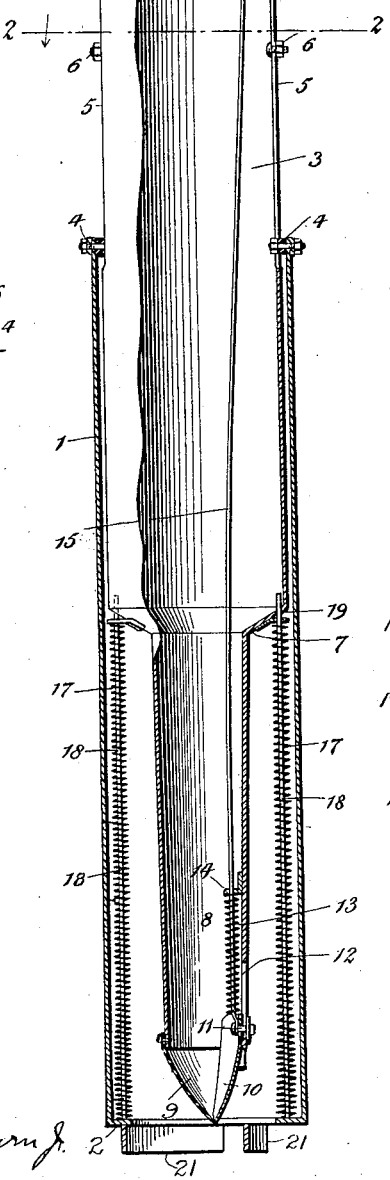

In the accompanying drawings, illustrating this invention, Figure 1 is a longitudinal section of a planting implement constructed in accordance with this invention. Fig. 2 is a transverse section on the line 2 2 of Fig. 1. Fig. 3 is an inverted view. Fig. 4 is a longitudinal section of the lower end portion of the implement and showing the parts in the position they assume when the lower end of the inner tube is depressed and when the movable shovel is raised.

Referring now to said drawings, 1 indicates an outer tube provided at its lower end with an inwardly-turned flange 2, forming a downwardly-facing shoulder. An inner tube 3 is situated at its lower end portion within the upper end portion of this outer tube 1 and connected therewith by means of pins 4 upon said outer tube 1, situated within slots 5 in said inner tube 3. The extent of movement between these tubes is regulated by adjustable blocks 6 within said slots 5. The lower end portion of the inner tube 3 is reduced in diameter to form a shoulder or ridge 7, from which point the said tube tapers toward its lower end, where it is preferably elliptical in cross-section. This section is indicated by 8 and is provided at its lower ends with a rigid inclined shovel 9 and a sliding inclined shovel 10. The said shovel 10 is provided with a pin 11, situated within a slot 12 in said section 8 of the inner tube. A spring 13 is situated between the upper end of said shovel 10 and a lug 14 upon the inner face of said tube 3 and serves to press the shovel outwardly to throw its lower end in contact with the rigid shovel 9. A cord or rod 15 is connected with the said shovel 10 and extends to the upper end of the inner tube and is fastened to a finger-piece 16, by means of which it may be drawn up to retract the shovel 10. Springs are situated between the inner and outer tubes to draw the inner tube forwardly with relation to the outer tube, and consist of spiral springs 17, carried by rods 18, fastened to the flange 2 of the outer tube and extending through openings 19 in the shoulder 7 of said inner tube. The said springs 17 press at their opposite ends against the lower end of the outer tube 1 and against the shoulder of the inner tube. The upper end of the inner tube is open and is provided with a handle 20.

I also provide blades 21, that serve to effectually throw the dirt over the deposited seed. These blades 21 are two in number and are fastened to the flange 2 of the outer tube. These blades are situated at an angle to the long axis of the elliptical end of the inner tube, as shown in Fig. 3 of the drawings, so that after dropping the seed and allowing the inner tube to rise the implement can be turned by the handle 20 to cause these blades to throw dirt into the hole and cover the seed.

The manner in which this planting implement is used is as follows: The operator first adjusts the blocks 6 to regulate the extent to which the inner tube can be pushed beyond the lower end of the outer tube and then carries the implement in his right hand by means of the handle 20. At the point where it is desired to drop the seed, which is thrown into the upper end of the inner tube by his left hand, he places the planter upon the ground and then presses downwardly with his right hand, which drives the shovels 9 and 10 the correct distance into the earth to make the hole. Then with his finger he operates the finger-piece 16 to open the shovel 10, which allows the seed to drop into the bottom of the hole just made, and then by twisting the implement the blades throw dirt back over the deposited seed, whereupon the implement is withdrawn.

It will thus be seen that various kinds of seed may be planted with this implement, varying from corn to potatoes, and in fact any seed may be deposited.

The implement is light and inexpensive and can be easily manipulated with one hand.

Having thus described my invention, what I claim as new, and desire to secure by Letters Patent, is—

1. A planting implement consisting of an outer and an inner tube secured together and movable longitudinally with relation to each other, a rigid and a movable shovel upon the lower end of said inner tube and which serve to close the said inner tube when in contact with each other, devices for moving said movable shovel with relation to said rigid shovel to open the lower end of said inner tube, and devices for moving said tubes relatively.

2. A planting implement consisting of an outer and an inner tube secured together and movable longitudinally with relation to each other, adjusting devices to limit the relative movement of said tubes, a rigid and movable shovel upon the lower end of said inner tube and which serves to close the said inner tube when in contact with each other, devices for moving said movable shovel with relation to said rigid shovel to open the lower end of said inner tube, and devices for moving said tubes relatively.

3. A planting implement consisting of an outer and an inner tube secured together and movable longitudinally with relation to each other, a longitudinal slot in said inner tube, an adjustable block situated within said slot, projections upon said outer tube that extend into said slot, a movable and a rigid shovel upon the lower end of said inner tube and which serve to close the said inner tube when in contact with each other, devices for moving said movable shovel with relation to said rigid shovel to open the lower end of said inner tube, and devices for moving said tubes relatively.

4. A planting implement consisting of an outer and an inner tube secured together and movable longitudinally with relation to each other, said inner tube having a contracted lower end, a rigid and a longitudinally-movable shovel upon the lower contracted end of said inner tube and which serve to close the said inner tube when said movable shovel is at the lower limit of its movement, a spring for depressing said movable shovel, a connecting-piece connected with said shovel and with an operating finger-piece near the upper end of said inner tube, and devices for moving said tubes relatively.

5. A planting implement consisting of an outer tube, a relatively-sliding inner tube provided at one end with a handle and with a sliding finger-piece, a stationary shovel at the other end of said tube, a sliding shovel adapted to come in contact with said stationary shovel, a spring for moving said sliding shovel outwardly, a connection between said sliding shovel and said finger-piece, and springs for moving said outer and inner tubes relatively, said springs being situated between rods secured to said outer tube and extending through a shoulder upon said inner tube.

6. In a planting implement, the relatively-movable outer and inner tubes, the shovels and means for operating the same, and an inwardly-projecting flange upon the lower end of said outer tube.

7. In a planting implement, the relatively-movable outer and inner tubes, the shovels and means for operating the same, and downwardly-projecting blades at the lower end of said outer tube.

8. In a planting implement, the relatively-movable outer and inner tubes, the shovels and means for operating the same, and blades projecting downwardly from the lower end of said outer tube and situated at an angle to said shovels.

9. In a planting implement, the relatively-movable outer and inner tubes, the shovels and means for operating the same, an inwardly-projecting flange upon the lower end of said outer tube, and downwardly-projecting blades upon said inwardly-projecting flange.

In testimony whereof I have signed this specification in the presence of two subscribing witnesses.

WILLIAM S. BLAISDELL.

Witnesses:
JOHN L. STEWART,
THOMAS GRAY.